Patented Oct. 25, 1932

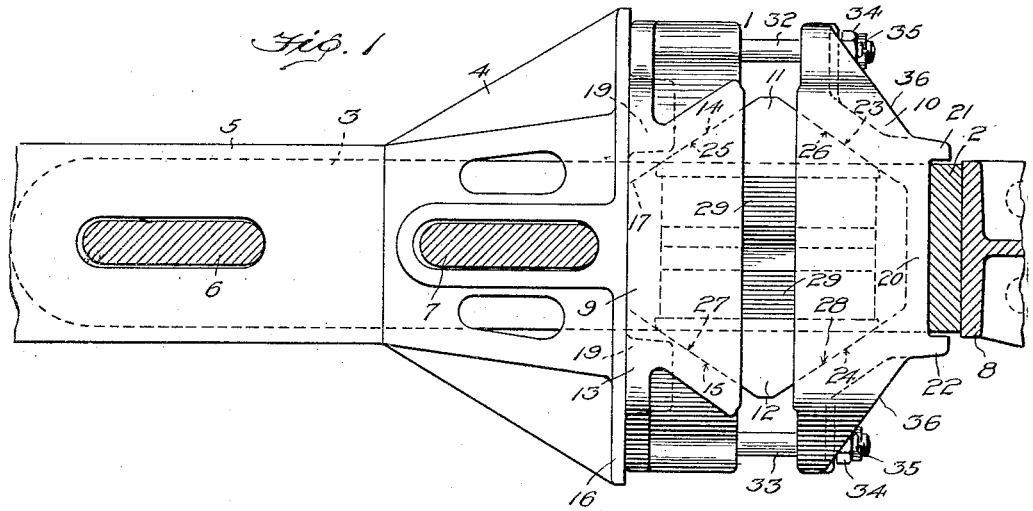

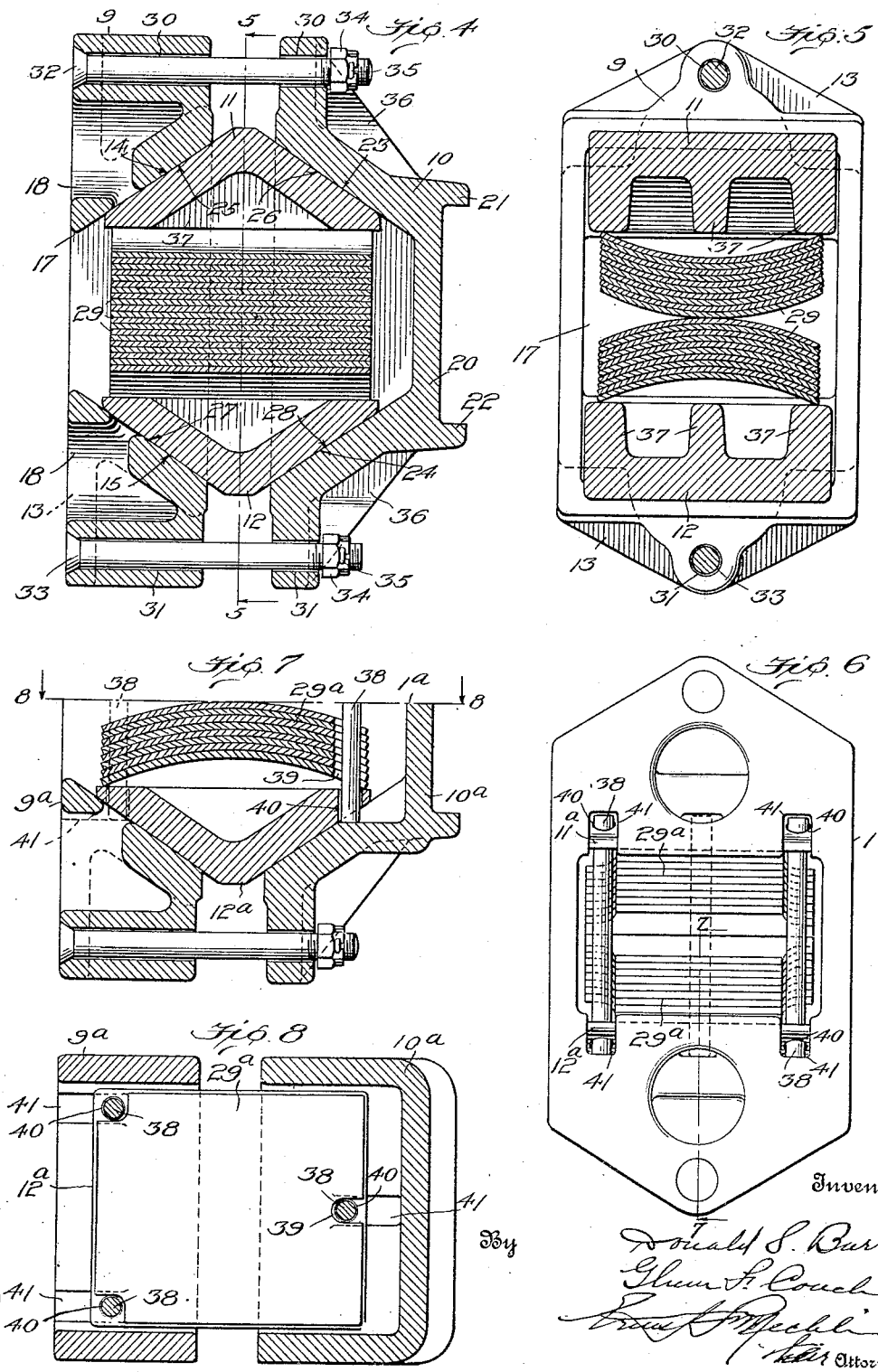

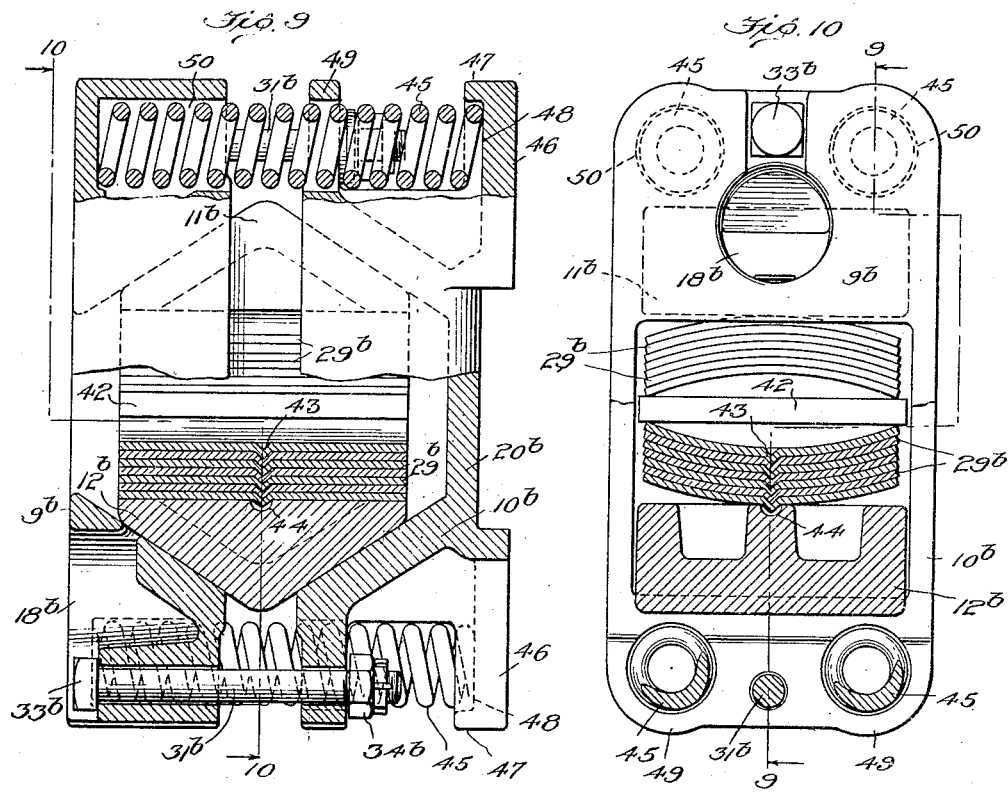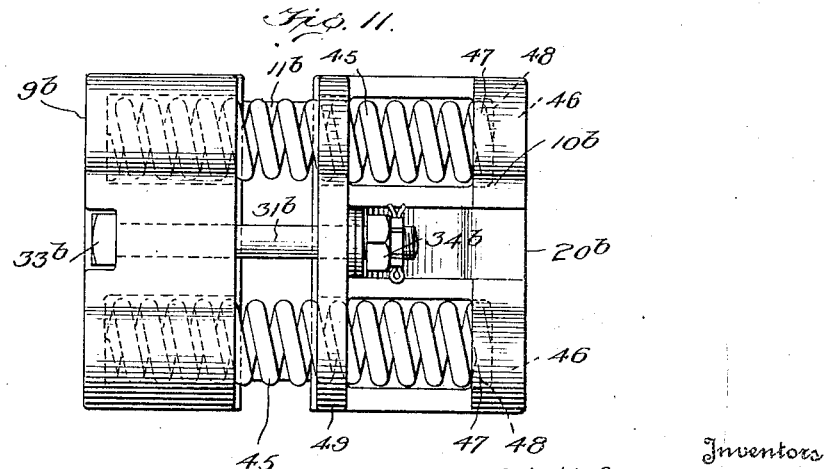

1,884,518

UNITED STATES PATENT OFFICE

DONALD S. BARROWS AND GLENN F. COUCH, OF ROCHESTER, NEW YORK, ASSIGNORS TO THE GOULD COUPLER COMPANY, OF NEW YORK, N. Y., A CORPORATION OF MARYLAND

DRAFT RIGGING

Application filed November 1, 1926. Serial No. 145,678.

This invention relates to draft rigging and cushioning mechanism therefor, and, more particularly, to friction cushioning mechanism adapted for replacing twin spring draft gear for railway cars.

The principal object of our invention, generally considered, is the provision of a compact and rugged friction cushioning mechanism particularly adapted for use with railway draft rigging and designed to be relatively tall, but of small longitudinal dimension, so as to replace or interchange with twin spring draft gear, said mechanism being so designed that it efficiently cooperates with the associated parts of the rigging and is held in proper position when in service.

An object of our invention is the provision of a relatively short friction draft gear of high capacity adapted for reception between the usual form of front follower and an associated horizontal yoke, said mechanism preferably comprising outer or front and rear friction elements provided with end walls from which top and bottom walls formed with inclined friction surfaces extend, said friction surfaces cooperating with corresponding surfaces on intermediate friction elements, which intermediate elements are urged apart and into engagement with the end elements by resilient means positioned therebetween, which resilient means preferably takes the form of curved leaf or plate springs for economizing space.

Another object of our invention is the provision of a cushioning mechanism formed relatively short and deep so that it may interchange with twin spring draft gear, said mechanism, for the purpose, having front and rear friction casings or elements provided with upper and lower inclined friction surfaces and intermediate elements positioned therebetween, said intermediate friction elements being disposed one above the other, the upper element being formed with downwardly sloping friction surfaces cooperating with the upper friction surfaces on the outer elements and the lower intermediate element being formed with upwardly sloping friction surfaces cooperating with the lower friction surfaces on the outer elements, said cooperating friction surfaces being preferably urged together by curved leaf springs arranged between the intermediate friction elements so that said springs will remain in proper position during operation of the gear without auxiliary retaining means therefor and retaining bolts extending into corresponding perforations in the outer friction elements for limiting relative movement therebetween and retaining the same in proper assembled relation.

A further object of our invention is the provision of a cushioning mechanism adapted to interchange with twin spring draft gear and formed with front and rear friction casings having upper and lower inclined friction surfaces, intermediate friction elements positioned therebetween and normally disposed one above the other, said elements being formed with friction surfaces cooperating with the friction surfaces on the front and rear friction casings, said cooperating surfaces being urged together by curved leaf springs positioned between intermediate friction elements, said leaf springs being formed with bosses thereon for interlocking said springs together and maintaining the same in proper position with respect to the intermediate friction elements, a filler piece being preferably provided between said springs, the outer friction elements, if desired, being formed with pockets at the corners thereof opening toward each other and springs mounted in said pockets to facilitate release of the mechanism and keep the front and rear friction casings in alinement.

Other objects and advantages of the invention relating to the particular arrangement and combination of the various parts will become apparent as the description proceeds.

Referring to the drawings illustrating our invention, the scope whereof is defined by the appended claims:

Figure 1 is a side elevation of a draft rigging embodying our invention, certain of the elements thereof being shown in section.

Figure 2 is a plan of the embodiment of our draft gear detached from the associated draft rigging parts.

Figure 3 is a front elevation of the gear shown in Figure 2.

Figure 4 is a vertical longitudinal sectional view on the line 4—4 of Figure 3 looking in the direction of the arrows.

Figure 5 is a transverse sectional view on the line 5—5 of Figure 4 looking in the direction of the arrows.

Figure 6 is a front end elevational view corresponding to Figure 3 but showing a slightly modified form of our invention.

Figure 7 is a partial longitudinal vertical sectional view on the line 7—7 of Figure 6 looking in the direction of the arrows.

Figure 8 is a horizontal sectional view on the line 8—8 of Figure 7 looking in the direction of the arrows.

Figure 9 is a vertical longitudinal sectional view on the line 9—9 of Figure 10, said view corresponding generally to Figures 4 and 7 but showing another embodiment of our invention.

Figure 10 is a transverse sectional view on the line 10—10 of Figure 9.

Figure 11 is a plan of the embodiment shown in Figures 9 and 10.

Referring to the drawings in detail, like parts being designated by like reference characters, and first considering the embodiment of our invention illustrated in Figures 1 to 5, inclusive, there is shown a draft gear or cushioning mechanism 1 positioned between the rear or U-shaped portion 2 of a usual form of horizontal yoke 3 and a front follower 4. The forward ends of the arms of the yoke 3 are connected to the rear end of a coupler 5 by means of a key 6 extending through correspondingly slotted portions of the coupler, yoke and associated draft sills (not shown) in accordance with usual practice with Farlow attachments. In a similar manner, the front follower 4 is held in proper assembled relation with respect to the rigging by a key 7 extending through correspondingly slotted portions in the associated sills, (not shown) yoke 3 and follower 4. The rear or U-shaped portion 2 of the yoke 3 is preferably adapted to abut the backstop 8 positioned and held between the draft sills (not shown) in any desired manner.

In the present embodiment of our invention, our cushioning mechanism, which is particularly adapted for use with railway draft rigging, comprises a front or outer friction element of casing 9, a rear or outer friction element or casing 10, an intermediate or top friction element 11 and an intermediate or bottom friction element 12. The front friction element or casing 9 preferably comprises an end wall 13 from which extend an inwardly and upwardly inclined wall providing a friction surface 14 and a downwardly and inwardly inclined wall providing a friction surface 15. The end wall 13 is adapted to abut the corresponding wall 16 of the front follower 4 and, on this account, may be provided with a relatively large aperture 17, adapted to be covered by the end wall 16, and approximately circular indentations or apertures 18 normally registering with and adapted to receive the usual spring positioning lugs 19 on the front follower 4, whereby said front follower and front friction element 9 are normally interlocked so that the gear is retained in the desired assembled relation. In this connection, it should be noted that inasmuch as our draft gear is particularly adapted for replacing and interchanging with twin spring draft gear, the same is preferably used with the usual form of front follower employed with such a gear and, therefore, such a follower is normally provided with spring positioning lugs 19 heretofore referred to.

The rear friction element 10 is preferably formed with a rear wall 20 bordered at its upper and lower edges by flanges or ribs 21 and 22, respectively, providing a groove or depression therebetween for receiving the rear or U-shaped portion 2 of the associated yoke 3, such cooperative association obviously providing for retaining the friction element 10 in the desired assembled relation with respect to said yoke. Extending forwardly and upwardly from the wall 20 is a wall providing an inclined friction surface 23 and extending downwardly and forwardly from the wall 20 is a wall providing an inclined friction surface 24. The friction surfaces 14 and 23 on the front and rear friction elements are adapted for frictional engagement with the correspondingly inclined friction surfaces 25 and 26 on the upper intermediate friction element 11 and the lower friction surfaces 15 and 24 are correspondingly adapted for engagement with the inclined friction surfaces 27 and 28 on the lower intermediate friction element 12.

The intermediate friction elements 11 and 12 are urged away from each other upwardly and downwardly, respectively, so that their friction surfaces engage the corresponding friction surfaces on the friction elements 9 and 10. The resilient means, for this purpose, in the present instance, takes the form of transversely curved plate springs 29 arranged in two groups with the convex sides thereof positioned toward each other. By means of this arrangement, it is unnecessary to provide means for preventing displacement of the spring plates when in service other than the side walls of the friction elements 9 and 10 and the adjacent portions of the intermediate friction elements 11 and 12. In order to prevent undue separation of the friction elements 9 and 10 when detached from the associated parts of the draft rigging, the adjacent portions of the elements 9 and 10 are preferably formed with upper registering perforations 30 and lower registering perforations 31, respectively receiving retaining bolts 32 and 33. It will be apparent that said bolts permit closing of the gear until the adjacent portions of the friction elements 9 and 10 engage, while preventing undue separation of said elements. In order that the friction element 9 may present a smooth surface to the adjacent follower 4, the heads of the bolts 32 and 33 are preferably countersunk into the end wall as illustrated particularly in Figure 4. The bolts are preferably threaded at the opposite ends thereof and castle nuts or other retaining means 34 applied thereon, whereby the effective length is maintained constant by having said nuts locked in place by cotters or the like 35.

For rigidifying the construction of the friction elements, which are preferably or conveniently formed as castings, webs 36 may be provided between the inclined walls and flanges and the rear wall of the friction element 10 and longitudinal webs or ribs 37 may be provided between the inclined walls providing the friction surfaces 25—26 and 27—28. It will be noted that although the bolts 32 and 33 are received in the front friction element 9 for substantially the full length thereof so that said bolts are retained in proper angular relation with respect to said element, yet the threaded ends of said bolts extend through only flanges on the rear friction element 10, the purpose of which being to permit said friction element 10 to move toward the element 9 by sliding on the bolts 32 and 33 without, at the same time, increasing the over-all length of the gear by causing the threaded ends of the bolts to extend be beyond the corresponding end of the gear.

Referring now to the modification of our invention illustrated in Figures 6, 7 and 8, a similar construction is there disclosed except that the plate or leaf springs 29$^a$ are curved or disposed longitudinally of the gear 1$^a$ instead of transversely thereof, that is, the curvature is from one end of the associated friction elements 11$^a$ and 12$^a$ to the other end thereof rather than from one side to the other side as in the first embodiment. On account of this construction, it is necessary to provide retaining means for preventing the curved ends of the springs 29$^a$ from slipping off the ends of the friction elements 11$^a$ and 12$^a$ and interfering with the action of the gear. Said springs, in the present embodiment, are, therefore, retained in place with respect to the intermediate friction elements 11$^a$ and 12$^a$ by means of a plurality of transverse retaining pins 38 extending through slots 39 in the plate springs and corresponding apertures 40 in the friction elements 11$^a$ and 12$^a$. In order to permit the retaining pins 38 to move with respect to the friction elements 9$^a$ and 10$^a$, the same are provided with appropriately slotted or notched portions 41 for receiving pins 38 upon closure of the gear, the notches preferably providing parallel walls the lower of which are engaged by the lower ends of said pins, and between which said pins are guided. Except as specifically described in connection with the present embodiment of our invention, the same may be substantially as disclosed in connection with the first embodiment.

Referring now to the embodiment of our invention illustrated in Figures 9, 10 and 11, a construction is there disclosed which is generally similar to that illustrated in Figures 1 to 5, inclusive, except that provision is made for insuring quick release of the mechanism. The mechanism or draft gear shown in these figures, therefore, comprises a front or outer friction element 9$^b$ and a rear or outer friction element 10$^b$, said elements being formed with inwardly directed and diverging friction surfaces, as in the first embodiment, co-operating with corresponding friction surfaces on intermediate friction elements 11$^b$ and 12$^b$. Said elements, as in the previous embodiments, are urged apart by curved leaf springs 29$^b$ which leaf springs, if desired, may be separated by filler means 42.

In accordance with the present embodiment, the plate springs 29$^b$ are shown formed with generally conical bosses or nubs 43, each of which cooperates with a corresponding indentation in the adjacent spring, the bosses on the outer spring plates, however, engaging in corresponding indentations 44 in the intermediate friction elements 11$^b$ and 12$^b$. The retaining bolts 31$^b$, instead of being formed with countersunk heads as in the previous embodiments, are preferably provided with square or other non-circular heads 33$^b$ which, when the nuts 34$^b$ are tightened in place, cooperate with the adjacent walls of the end friction element 9$^b$ and prevent turning of the bolts 31$^b$ thereby facilitating assembly of the gear. Bolts with similar heads may be employed, if desired, alternatively with the bolts 30 of the first embodiment.

In order to assist the springs 29$^b$, increase the capacity of the gear, insure prompt release of said gear, and keep the friction casings or elements 9$^b$ and 10$^b$ in alinement, release springs 45 are provided. Said springs 45 are preferably coil compression springs, one of which is positioned at each corner of the casings 9$^b$ and 10$^b$, as illustrated particularly in Figures 10 and 11. In order to provide for holding and housing the corresponding ends of the springs, the end walls 20$^b$ are continued upwardly and downwardly to substantially the full height and width of the gear as indicated particularly at 46. From these end walls extend curved beads or flanges 47 providing pockets 48 in which the corresponding ends of the springs 45 are received and fit. The inner ends of the inclined portions of the end wall 20$^b$ may be extended upwardly and downwardly to surround intermediate portions of the springs 45 as indicated at 49. Spring pockets 50 are also preferably provided in the friction element 9$^b$.

From the foregoing, it will be apparent that the modification illustrated in Figures 9, 10 and 11 corresponds fairly closely with that of the first embodiment of our invention except for the springs 45 which increase the capacity of the gear and serve to keep the end friction elements in proper alinement. If desired, the bolts 31$^b$ may correspond with those of the first embodiment although it is preferred to have the heads non-circular as it makes the assembly of the parts easier. The spacing member 42 between the springs 29$^b$ may be omitted, if desired, as in the first embodiment, although it would then be preferable to place the sets of springs 29$^b$ convex toward each other rather than concave toward each other as in the present embodiment. In the latter embodiment by virtue of fixing the spring sets convex outwardly or concave toward each other, it is possible to provide for properly interlocking said springs with respect to the associated intermediate friction elements as heretofore disclosed. As in the first embodiment, apertures or pockets 18$^b$ are provided for receiving cooperating positioning bosses 19 on the usual front follower.

Although we have described our cushioning mechanism as employed with Farlow attachments comprising a horizontal yoke, backstop, front follower and draft keys, yet we do not wish to be limited to such use as said mechanism, if desired, may be employed with other forms of draft rigging and used with other types of yokes than here disclosed. Although the gear has been shown as used in a vertical position and suitable for replacing twin spring draft gears, yet, if desired, it may be used in other positions, for example, in a horizontal position. From the foregoing disclosure of our invention, it will be apparent that we have devised a compact gear which, although occupying very little space because of the use of leaf springs may be of relatively high capacity by virtue of the great strength which may be given to such springs. It will be apparent that a gear of great flexibility has been devised which is adapted for use in numerous relations and, because of the relatively simple form of the parts, such gears may be constructed at relatively small cost.

Having now described our invention, we claim:

1. A cushioning mechanism comprising relatively short outer friction elements formed with end walls and portions of each extending close toward those of the other and formed with inclined friction surfaces, one of said outer friction elements being formed with indentations adapted to receive spring positioning lugs, whereby it is adapted to interchange with twin spring gear for use with railway draft rigging, intermediate friction elements positioned therebetween and formed with correspondingly inclined friction surfaces engaging the friction surfaces on the outer elements, and resilient means positioned between the intermediate friction elements to urge them apart and into engagement with the friction surfaces on the outer friction elements.

2. A cushioning mechanism adapted for use with railway draft rigging comprising outer friction elements formed with end walls and inclined friction surfaces extending therefrom, the end wall of one of said elements being formed with apertures adapted for receiving positioning lugs on an associated follower, intermediate friction elements positioned therebetween and formed with corresponding inclined friction surfaces engaging the friction surfaces on the outer elements, and resilient means positioned between the intermediate friction elements to urge them apart and into engagement with the friction surfaces on the outer friction elements.

3. A cushioning mechanism adapted for use with railway draft rigging comprising outer friction elements formed with end walls and inclined friction surfaces extending therefrom, the end wall of one of said elements being formed with apertures adapted for receiving positioning lugs on an associated follower, the end walls of both of said outer friction elements being provided with inwardly opening pockets, coil compression springs mounted in said pockets to facilitate release of the mechanism, intermediate friction elements positioned between said outer friction elements and formed with correspondingly inclined friction surfaces engaging the friction surfaces on the outer elements, and resilient means positioned between the intermediate friction elements to urge them apart and into engagement with the friction surfaces on the outer friction elements.

4. In a draft rigging, in combination, a yoke, a coupler, a follower held in position between the elements of said yoke to the rear of said coupler and a cushioning mechanism cooperating with said follower and disposed between the same and the rear end of the yoke, said mechanism comprising front and rear friction elements formed with end walls and inclined friction surfaces extending therefrom and toward each other, said friction elements cooperating, respectively, with the follower and the engaging portion of the yoke for retaining the same in proper assembled relation, intermediate friction elements positioned between said front and rear friction elements and formed with friction surfaces engaging the friction surfaces on the front and rear elements, resilient means positioned between the intermediate friction elements to force them apart and into engagement with the friction surfaces on the other friction elements and retaining means connecting the front and rear friction elements, permitting limited relative movement thereof and serving to maintain said friction elements in assembled relation even when disconnected from the associated draft rigging.

5. In a draft rigging, in combination, a yoke, a coupler connected to said yoke, a follower held in position between the elements of said yoke to the rear of said coupler and a cushioning mechanism cooperating with said follower and disposed between the same and the rear end of the yoke, said mechanism comprising front and rear friction elements formed with end walls and inclined friction surfaces extending therefrom, the end wall of said front element being formed with apertures and the rear wall of the follower being formed with corresponding positioning lugs receivable in said apertures, intermediate friction elements positioned therebetween and formed with correspondingly inclined surfaces engaging the friction surfaces on the front and rear elements, and resilient means positioned between the intermediate friction elements to urge them apart and into engagement with the friction surfaces on the outer friction elements.

6. In a draft rigging, in combination, a yoke, a coupler, a follower held in position between the elements of said yoke to the rear of said coupler and a cushioning mechanism cooperating with said follower and disposed between the same and the rear end of the yoke, said mechanism comprising front and rear friction elements formed with end walls and inclined friction surfaces extending therefrom and toward each other, spring receiving pockets on the end wall of each friction element inwardly opening toward corresponding spring receiving pockets on the other friction element, a spring positioned in each of said pockets to facilitate release of the mechanism, said friction elements cooperating respectively with the follower and the engaging portion of the yoke for retaining the same in proper assembled relation, intermediate friction elements positioned between said front and rear friction elements and formed with friction surfaces engaging the friction surfaces on the front and rear friction elements and resilient means positioned between the intermediate friction elements to force them apart and into engagement with the friction surfaces on the other friction elements.

7. In a draft rigging, in combination, a horizontal yoke, a coupler, means connecting said coupler and yoke, a front follower disposed rearwardly of said coupler between the arms of said yoke and provided with rearwardly extending lugs, cushioning mechanism disposed rearwardly of said follower and embraced by said yoke and comprising relatively short closely spaced friction elements formed with end walls and inclined friction surfaces extending therefrom, the friction elements adjacent the front follower receiving the lugs on said follower, intermediate friction elements positioned therebetween and formed with correspondingly inclined friction surfaces engaging the friction surfaces on the outer elements, and plate springs disposed between the intermediate friction elements to force them apart and into engagement with the friction surfaces on the outer friction elements.

8. A cushioning mechanism adapted for use with railway draft rigging comprising outer friction elements formed with end walls and portions with inclined friction surfaces extending therefrom, intermediate friction elements positioned therebetween and formed with correspondingly inclined friction surfaces engaging the friction surfaces on the outer elements, curved plate springs positioned between the intermediate friction elements and adapted to be straightened when the mechanism is compressed, and transverse pins with their end portions received in apertures in the intermediate friction elements and having their ends slidable between and guided by parallel walls on the outer friction elements, said plate springs having slots at their ends receiving intermediate portions of said pins for preventing said springs from slipping out of position with respect to said intermediate friction elements.

In testimony whereof we affix our signatures.

DONALD S. BARROWS.
GLENN F. COUCH.